UNITED STATES PATENT OFFICE.

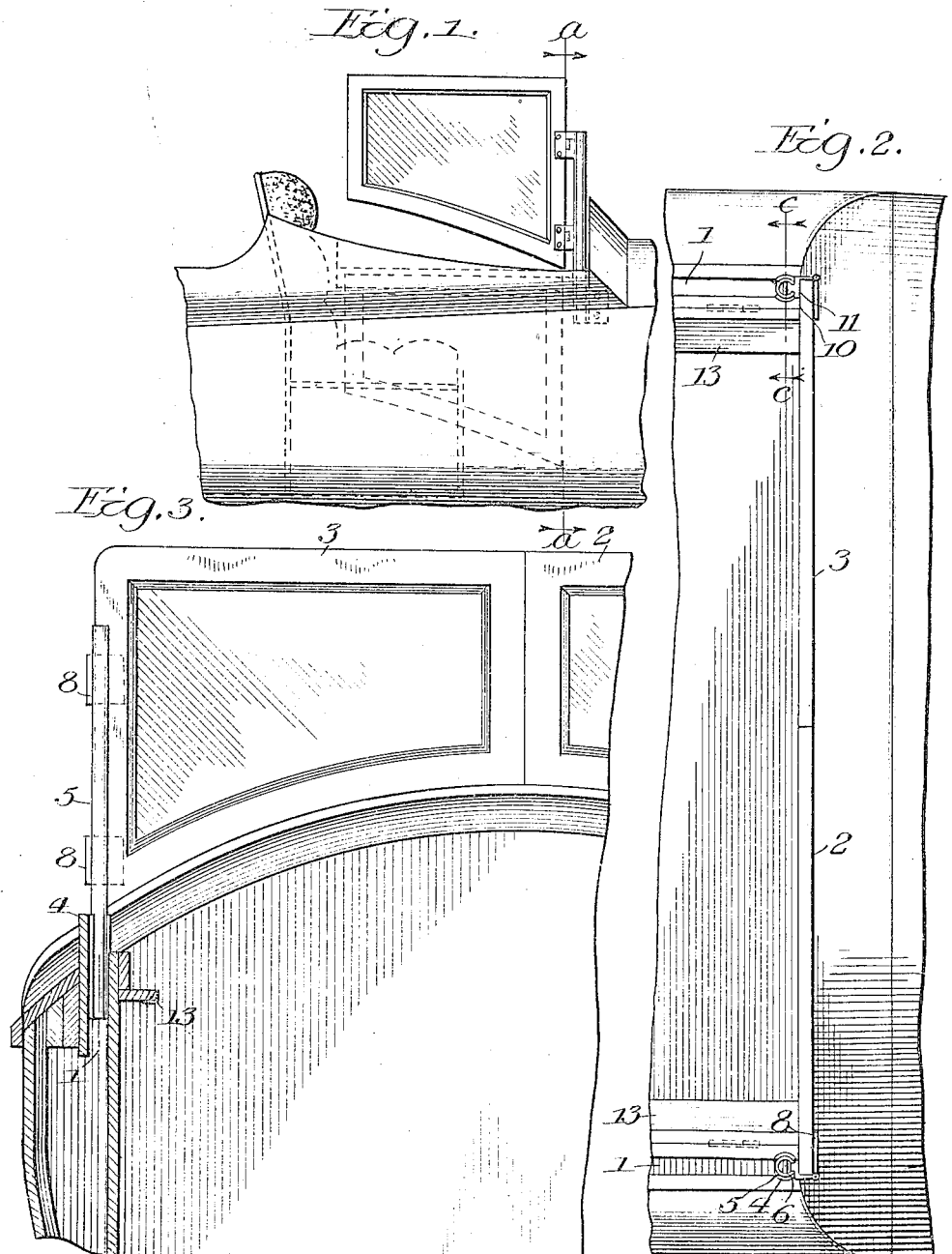

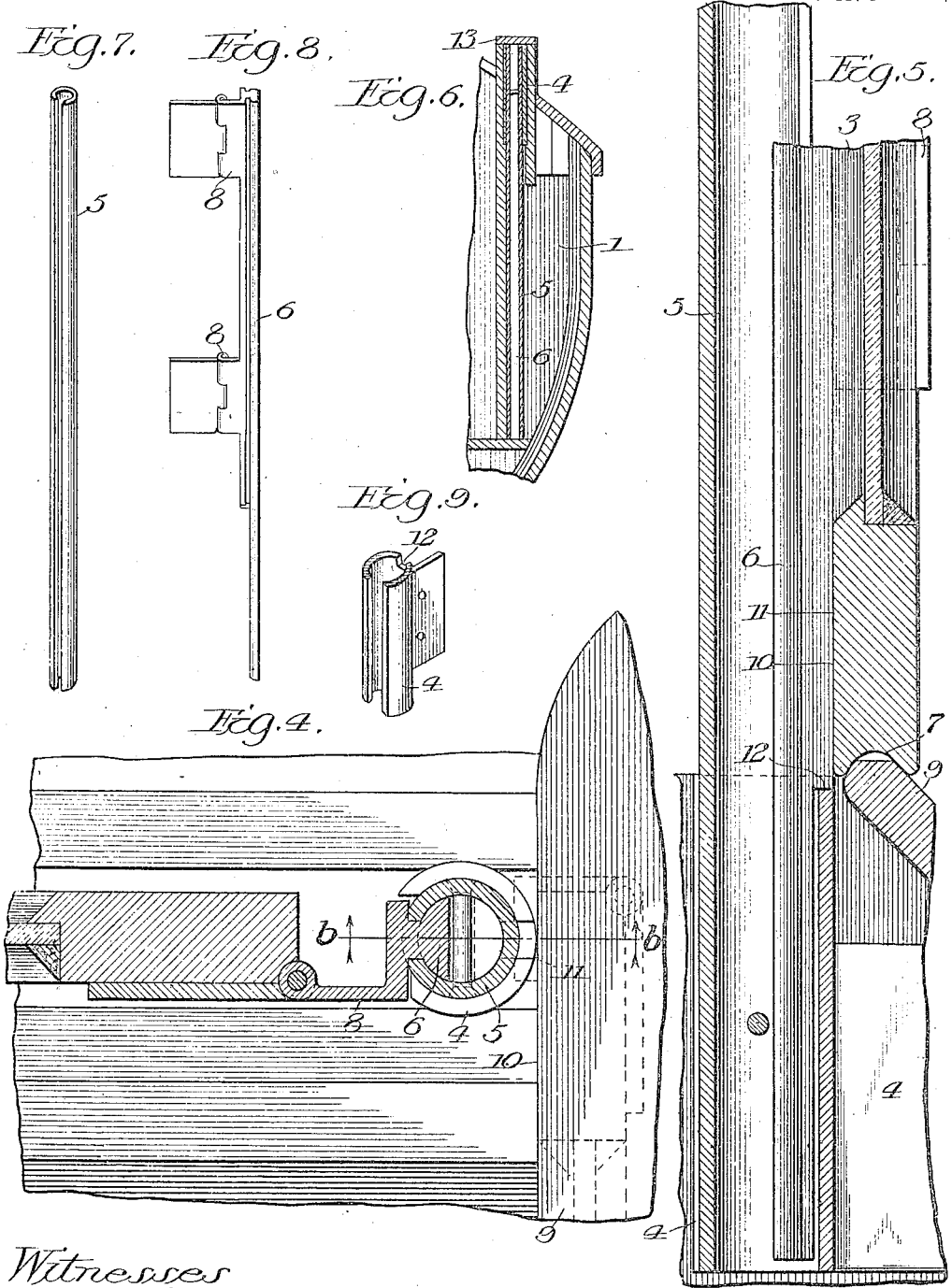

ALBERT W. CROUCH, OF MILWAUKEE, WISCONSIN, ASSIGNOR TO MILWAUKEE YACHT & BOAT COMPANY, OF MILWAUKEE, WISCONSIN.

WIND-SHIELD.

1,159,476.   Specification of Letters Patent.   Patented Nov. 9, 1915.

Application filed February 16, 1914. Serial No. 818,849.

*To all whom it may concern:*

Be it known that I, ALBERT W. CROUCH, a citizen of the United States, residing at Milwaukee, in the county of Milwaukee and State of Wisconsin, have invented a certain new and useful Improvement in Wind-Shields, of which the following is a full, clear, concise, and exact description, reference being had to the accompanying drawings, forming a part of this specification.

My invention relates to wind shields and is designed to provide a disappearing wind shield which may be easily mounted in place, and then as easily swung out of position and dropped within a suitable receiving compartment to be out of the way.

More particularly my invention is applicable to wind shields for motor boats.

In the preferred form of my invention, I construct the wind shield in two halves which are mounted respectively at the sides, and which in their elevated positions swing toward the center to provide a complete wind shield, and which two wind shields may be swung out of their protecting positions and then dropped into receiving compartments, whereby they may be out of the way.

I will describe this particular form which my invention may take more in detail by referring to the accompanying drawings illustrating the same, in which—

Figure 1 is a partial side view of a portion of a boat having my improved wind shield; Fig. 2 is a plan view of a portion of a boat showing my improved wind shield in place; Fig. 3 is a sectional view on line *a—a* of Fig. 1, the wind shields however having been swung over to their protecting position; Fig. 4 is a fragmentary top view partially in section illustrating the carrying mechanism for the wind shields; Fig. 5 is a sectional view on line *b—b* of Fig. 4; Fig. 6 is a partial sectional view on line *c—c* of Fig. 2, the wind shield having been dropped into its compartment, and Figs. 7, 8 and 9 are perspective views of various elements.

In accordance with my invention, if the same is to be applied to motor boats, I provide two slots 1, 1, respectively at the opposite sides of the passengers cockpit into which each one of the halves 2 and 3 respectively of my improved wind shield is adapted to disappear. The slots are provided with tubular casings 4 within which a tube 5 may slide, which tube carries a slidable supporting element 6 carrying hinge elements 8 to support the wind shield halves 2 or 3 respectively. The element 6 may slide up and down within the tube 5 and the tube 5 may slide up and down within the casing 4.

By referring for instance to Fig. 1, it will be seen that the wind shield itself when in its completely raised position has its top edge considerably elevated above the tube 5, but when the device is entirely collapsed and out of view, the wind shield by reason of its slidable connection with the tube 5 may slide downwardly and the tube 5 slide downwardly so as to be completely within the slot 1 provided for it. In Fig. 1, I have shown in dotted lines the position of the wind shield when entirely within the slot and have shown in full lines the wind shield when entirely elevated, whereas in Fig. 4, I have shown the wind shield in its proper protecting position by means of dotted lines, at which time the lower grooved portion 7 of the wind shield rests on top of the rounded portion of the dashboard 9. In this position the wind shield is properly supported or may be otherwise held by suitable clamps if so desired.

The arrangement is such, by referring to the dotted position of Fig. 5, that the wind shield may be swung either inboard or outboard from its protecting position to its disappearing position, and this is necessitated by the presence of the steering wheel at one side of the cockpit, it being impossible in many constructions to have the wind shield clear the steering wheel. By reason of the construction thus provided, it will be seen that the shield can be swung in either direction as desired.

As is also more clearly apparent from Fig. 5, the inner edge 10 of the wind shield rests against the flat surface 11 of the slidable element 6, thus to be held in place against displacement by the wind. The upper portion of the tubular element 4 is provided with a slot 12, into which the element 6 may return after being swung into the protecting position so as to prevent rotation of the elements 5, 6 and the shield when in this protecting position. In this way the entire structure is rigid, easily rotated into position as desired, and as easily taken out of its protecting position and placed within the slot 1 to be hid completely from view. A cover plate 13 then closes the top of the slot in any desired manner.

From what has been described it is thought the nature of my invention will be entirely clear to those skilled in the art, and it will also be clear that many changes and modifications may be made without departing from the spirit of my invention as herein disclosed.

Having however thus described one form which my invention may take, what I claim as new and desire to secure by Letters Patent is:

1. Apparatus of the character described comprising a wind shield, a support to which said wind shield is hinged, an element for slidably carrying said support, and a second element within which said first aforesaid element slides.

2. Apparatus of the character described comprising a wind shield, a support to which said wind shield is hinged, an element for slidably carrying said support, a second element within which said first aforesaid element slides, and means associated with said support for locking the same in position to brace the wind shield in its protecting position.

3. Apparatus of the character described comprising a wind shield, a support to which said wind shield is hinged, means for slidably carrying said support, and means associated with said support for locking the same in position to brace the wind shield in its protecting position.

4. Apparatus of the character described comprising a wind shield divided in two halves, means for swingingly mounting said two halves, and means for slidably holding said means.

5. Apparatus of the character described comprising a wind shield divided in two halves, means for swingingly mounting said two halves, means for slidably holding said means, and locking means interposed between said two means operative when in a given position.

6. In apparatus of the character described the combination with a swinging wind shield, means for swingingly mounting said wind shield in a plane on an axis substantially parallel to said wind shield means for holding said wind shield in its protecting position, a slot, slidable means for raising and lowering said wind shield when alined with said slot, a dash board, and means whereby said wind shield is adapted to seat upon the top of said dashboard.

7. Apparatus of the character described comprising a wind shield, means for swingingly mounting said wind shield to swing on an axis in a plane substantially parallel to said shield, slidable means permitting raising and lowering of said wind shield, a dashboard, and means whereby said wind shield is adapted to seat upon the top of said dashboard.

8. Apparatus of the character described comprising a wind shield divided in two halves, means for swingingly mounting said two halves, means for slidably holding said means, a dashboard, and means whereby said wind shield halves are adapted to seat upon the top of said dashboard.

9. Apparatus of the character described comprising a wind shield, a support to which said wind shield is hinged, means for slidably carrying said support, a dashboard, and means whereby said wind shield is adapted to seat upon the top of said dashboard.

10. A device of the character described comprising a wind shield, means for pivotally supporting said wind shield, and means for slidably holding said means, said means serving to support said wind shield against displacement by wind pressure when in its protecting position.

11. A wind shield of the disappearing type having two halves adapted to be alined when in their operative position, and means whereby said halves are pivotally mounted along axes substantially parallel to said halves at the outer extremities thereof so that said halves may be swung into disappearing positions substantially parallel to each other, said means having means to permit the swinging of at least one of said halves to its disappearing position, in an outward direction.

In witness whereof, I hereunto subscribe my name this 29th day of January, A. D., 1914.

ALBERT W. CROUCH.

Witnesses:
 FRED. O. MUELLER,
 PETER COOGAN.